(12) United States Patent
Hashizume et al.

(10) Patent No.: US 12,466,344 B2
(45) Date of Patent: Nov. 11, 2025

(54) SEAT PAD AND SEAT PAD MANUFACTURING METHOD

(71) Applicant: Archem Inc., Tokyo (JP)

(72) Inventors: Akira Hashizume, Tokyo (JP); Masaki Shinagawa, Tokyo (JP)

(73) Assignee: Archem Inc., Tokyo (JP)

( * ) Notice: Subject to any disclaimer, the term of this patent is extended or adjusted under 35 U.S.C. 154(b) by 159 days.

(21) Appl. No.: 18/565,240

(22) PCT Filed: Nov. 17, 2021

(86) PCT No.: PCT/JP2021/042320
§ 371 (c)(1),
(2) Date: Nov. 29, 2023

(87) PCT Pub. No.: WO2022/264448
PCT Pub. Date: Dec. 22, 2022

(65) Prior Publication Data
US 2024/0278739 A1     Aug. 22, 2024

(30) Foreign Application Priority Data
Jun. 15, 2021    (JP) ................................. 2021-099724

(51) Int. Cl.
*B60R 16/02*      (2006.01)
*B29C 44/12*      (2006.01)
(Continued)

(52) U.S. Cl.
CPC .......... *B60R 16/0215* (2013.01); *B29C 44/12* (2013.01); *B29C 44/583* (2013.01);
(Continued)

(58) Field of Classification Search
CPC ... B60R 16/0215; B29C 44/12; B29C 44/583; B60N 2/7017
See application file for complete search history.

(56) References Cited

U.S. PATENT DOCUMENTS

2018/0272905 A1    9/2018   Ruff et al.

FOREIGN PATENT DOCUMENTS

JP      2009208495 A      9/2009
JP      2012126266 A   *   7/2012
(Continued)

OTHER PUBLICATIONS

Dec. 14, 2023, International Preliminary Report on Patentability issued in the International Patent Application No. PCT/JP2021/042320.

(Continued)

*Primary Examiner* — Anthony D Barfield
(74) *Attorney, Agent, or Firm* — KENJA IP LAW PC

(57) ABSTRACT

A seat pad (1) includes a surface portion (1a) configured of a polyurethane foam (11). In the surface portion (1a), wiring grooves (2) for wiring a wire harness (3) are formed. Each wiring groove (2) has a groove width W narrower than the diameter (ϕ3) of the harness (3), and a groove depth (D) deeper than the diameter ϕ3 of the harness (3). A seat pad manufacturing method uses, as a molding die, a molding die that has groove-forming protrusions to form the wiring grooves (2) and has holes formed in side surfaces of the groove-forming protrusions. A polyurethane foam material is supplied to an interior of the molding die, and when a molded product is removed from the molding die, molded portions formed in the holes are forcibly pulled out of the holes of the groove-forming protrusions.

9 Claims, 10 Drawing Sheets

(51) Int. Cl.
    *B29C 44/58*     (2006.01)
    *B29K 75/00*     (2006.01)
    *B29L 31/00*     (2006.01)
    *B60N 2/70*     (2006.01)

(52) U.S. Cl.
    CPC ........ *B60N 2/7017* (2013.01); *B29K 2075/00* (2013.01); *B29L 2031/771* (2013.01)

(56) References Cited

FOREIGN PATENT DOCUMENTS

| | | | |
|---|---|---|---|
| JP | 2018158096 A | | 10/2018 |
| JP | 2019038291 A | | 3/2019 |
| JP | 2019088385 A | | 6/2019 |
| JP | 2020155227 A | * | 9/2020 |

OTHER PUBLICATIONS

Feb. 8, 2022, International Search Report issued in the International Patent Application No. PCT/JP2021/042320.

* cited by examiner

SEAT PAD AND SEAT PAD MANUFACTURING METHOD

TECHNICAL FIELD

The present disclosure relates to a seat pad and a seat pad manufacturing method.

BACKGROUND

Some conventional seat pads are formed with wiring grooves (guide grooves) for wiring wire harnesses (cable harnesses) (see, for example, Patent Literature (PTL) 1).

CITATION LIST

Patent Literature

PTL 1: JP 2018-158096 A

SUMMARY

Technical Problem

However, in the above conventional seat pad, after a wire harness is wired along guide grooves, the wire harness needs to be secured with tape or the like. Therefore, the above conventional seat pad has room for improvement in terms of workability during wiring work and reduction in costs required for the wiring work.

It would be helpful to provide a seat pad that improves the workability of wiring work and reduces costs required for the wiring work, and to provide a seat pad manufacturing method for easily obtaining the seat pad.

Solution to Problem

A seat pad according to the present disclosure is a seat pad including a surface portion configured of a polyurethane foam, wherein in the surface portion, a wiring groove for wiring a wire harness is formed, and the wiring groove has a groove width narrower than the diameter of the wire harness, and a groove depth deeper than the diameter of the wire harness. According to the seat pad of the present disclosure, the workability of wiring work is improved, and costs required for the wiring work are reduced.

In the seat pad according to the present disclosure, on a side surface of the wiring groove, a projection projecting inward in a groove width direction is preferably formed. In this case, the wire harness can be secured more firmly.

In the seat pad according to the present disclosure, the groove width is preferably a groove width capable of being molded using a molding die. In this case, the seat pad can be manufactured inexpensively.

In the seat pad according to the present disclosure, the groove depth is preferably three or more times the diameter of the wire harness. In this case, the wiring can be secured more firmly.

In the seat pad according to the present disclosure, an expanded foam is disposed inside the surface portion. In this case, the seat pad has the wiring groove with excellent durability.

A seat pad manufacturing method according to the present disclosure is a seat pad manufacturing method for obtaining, using at least a molding die and a polyurethane foam material, a seat pad including a surface portion configured of a polyurethane foam, the seat pad being formed with a projection projecting inward in a groove width direction on a side surface of a wiring groove formed in the surface portion, the seat pad manufacturing method including using, as the molding die, a molding die that has a groove-forming protrusion to form the wiring groove and has a hole formed in a side surface of the groove-forming protrusion, supplying the polyurethane foam material to an interior of the molding die, and forcibly pulling a molded portion formed in the hole out of the hole of the groove-forming protrusion when a molded product is removed from the molding die. According to the seat pad manufacturing method of the present disclosure, the seat pad that improves the workability of the wiring work and reduces costs required for the wiring work can be easily obtained.

Advantageous Effect

According to the present disclosure, it is possible to provide a seat pad that improves the workability of wiring work and reduces costs required for the wiring work, and to provide a seat pad manufacturing method for easily obtaining the seat pad.

DETAILED DESCRIPTION

A seat pad and a seat pad manufacturing method according to an embodiment of the present disclosure will be described below with reference to the drawings.

(Seat Pad)

A seat pad 1 according to an embodiment of the present disclosure is a vehicle seat pad used in a vehicle seat (an automobile seat). In the following description, "upper," "lower," "left," "right," "front," and "rear" refer to directions as viewed from a seated person who is sitting on the seat. In the following description, a "left-right direction" is also referred to as a "width direction." In this embodiment, a "lower surface" and a "bottom surface" are synonymous. Furthermore, in this embodiment, a "rear surface" and a "back surface" are also synonymous.

Figure 1:
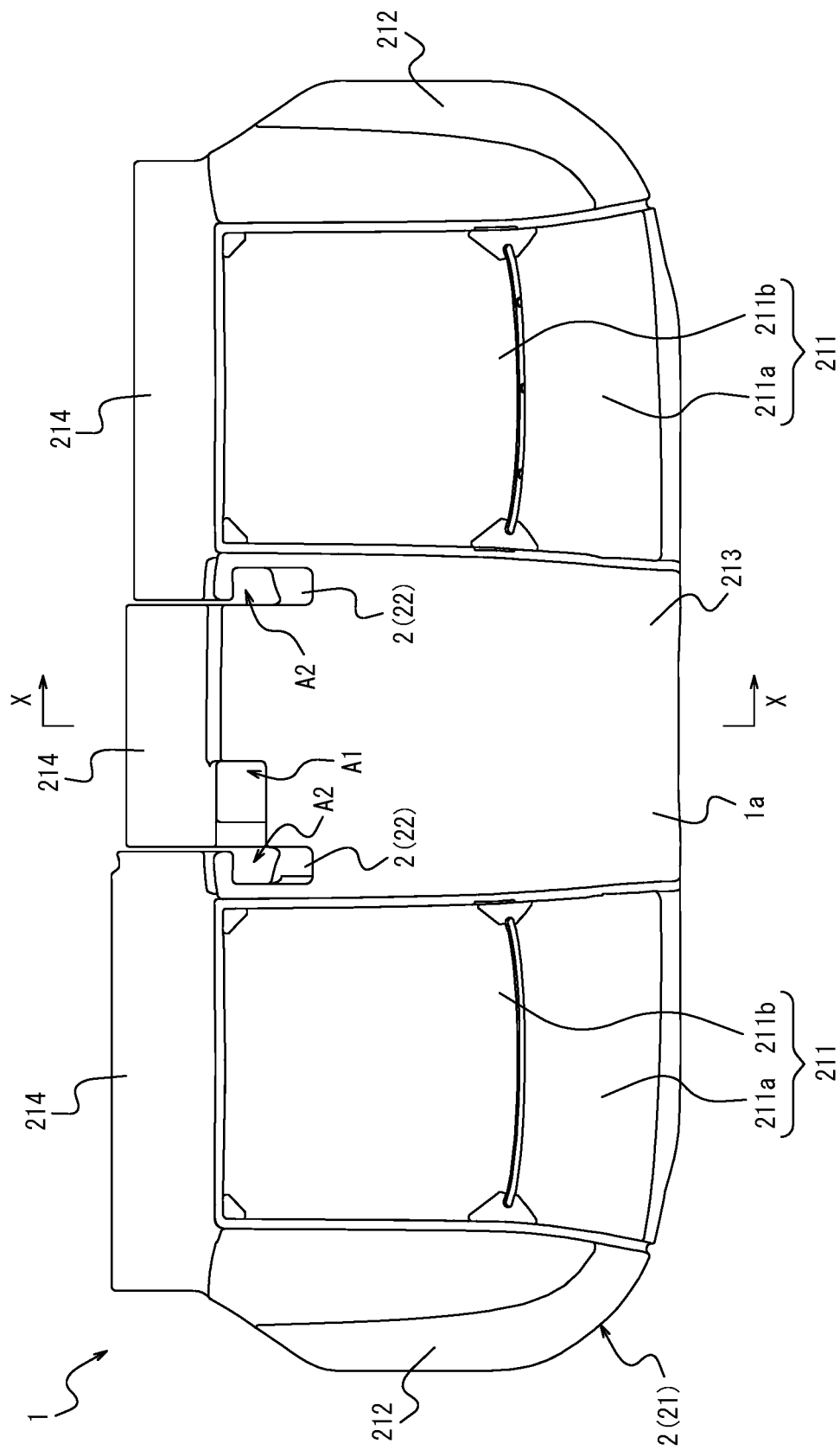
FIG. 1 is a plan view schematically illustrating a seat pad according to one embodiment of the present disclosure.
Figure 2:
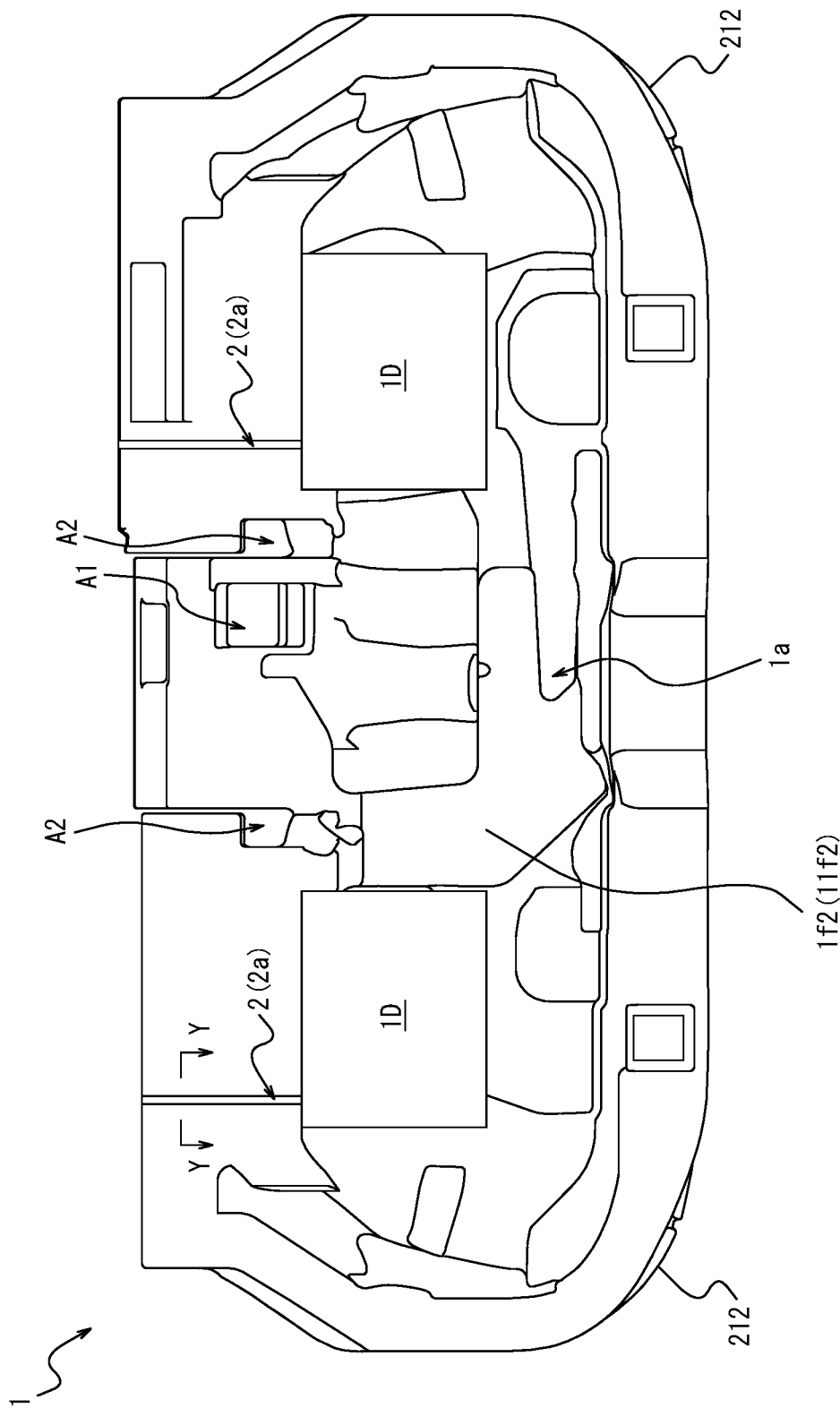
FIG. 2 is a bottom view schematically illustrating the seat pad of FIG. 1.
Figure 3:
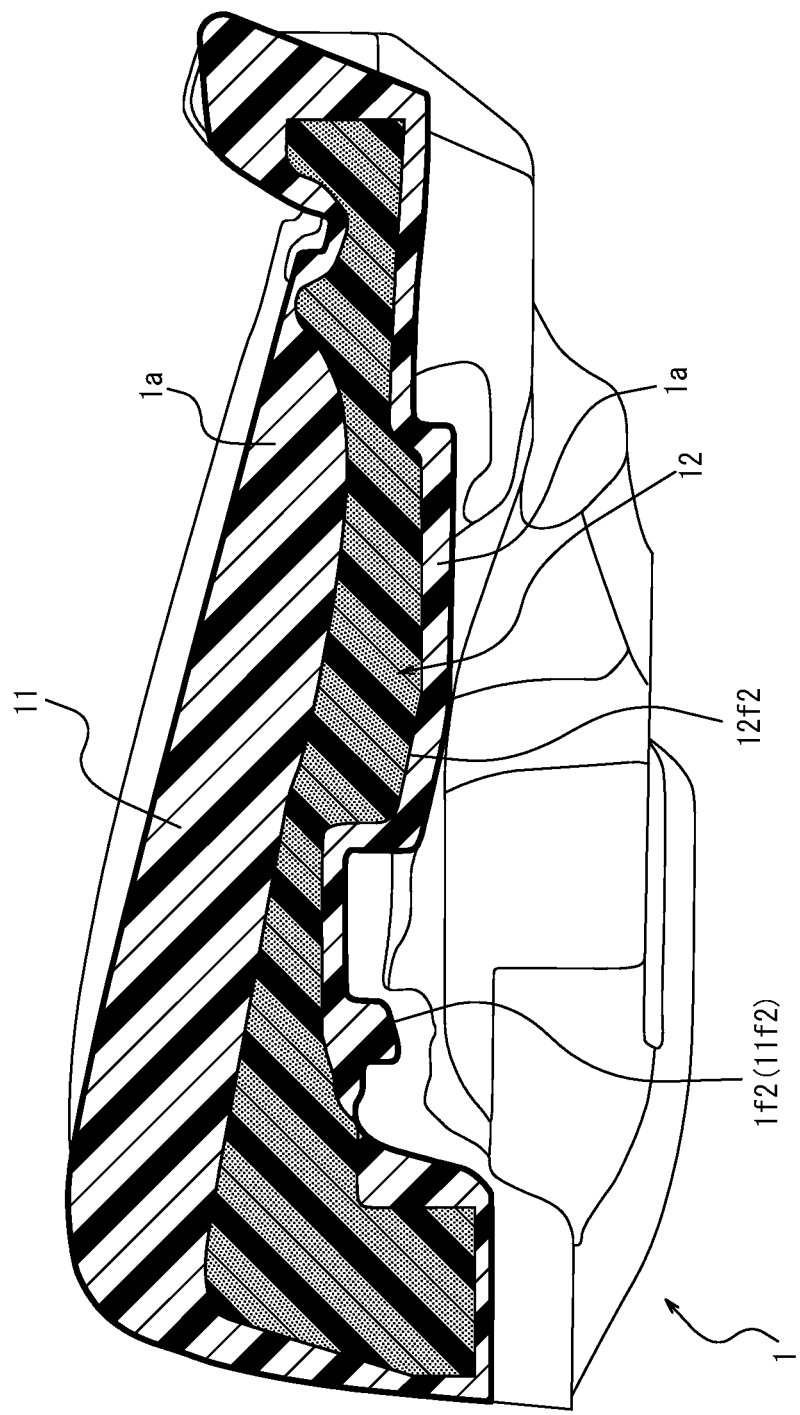
FIG. 3 is an X-X cross-sectional view of the seat pad of FIG. 1.
Figure 4:
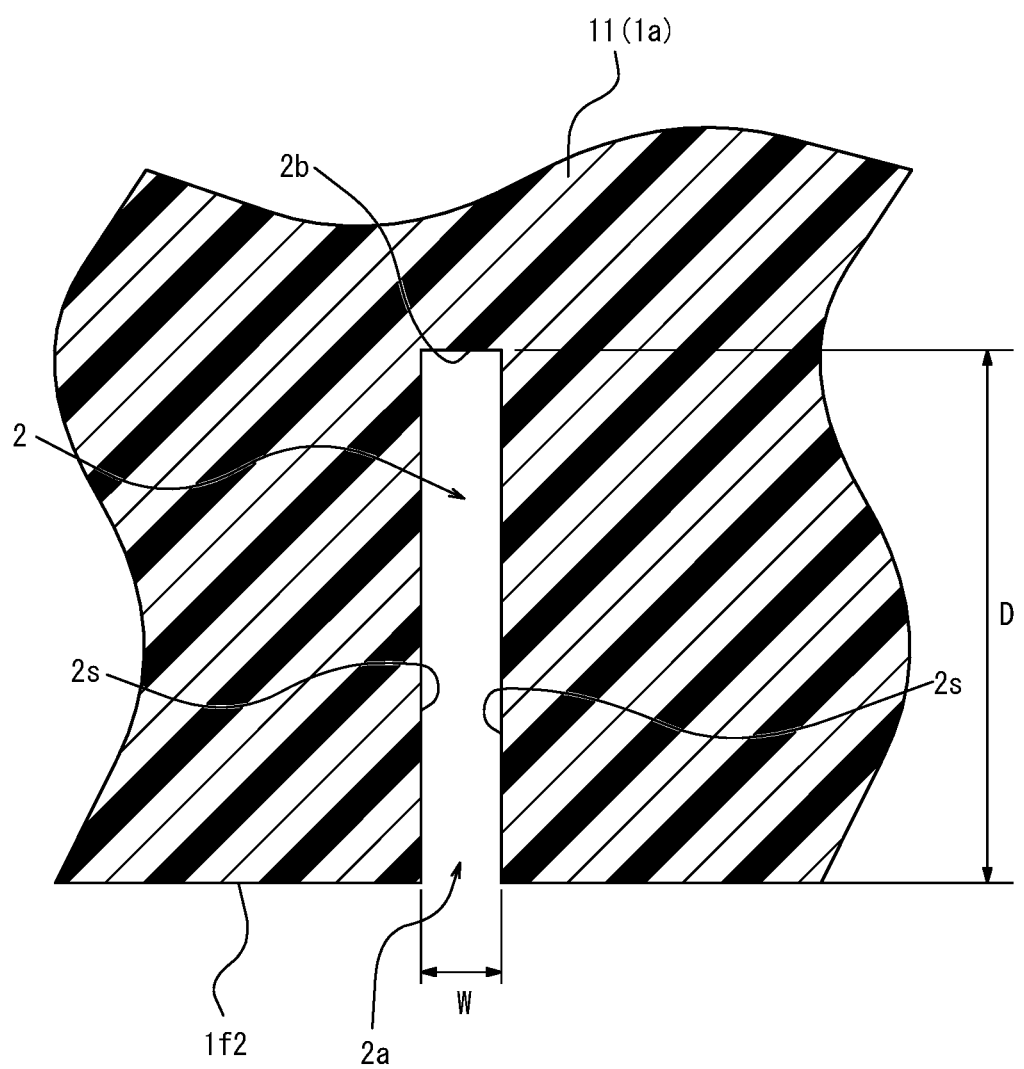
FIG. 4 is a Y-Y cross-sectional view of FIG. 2.
Figure 5:
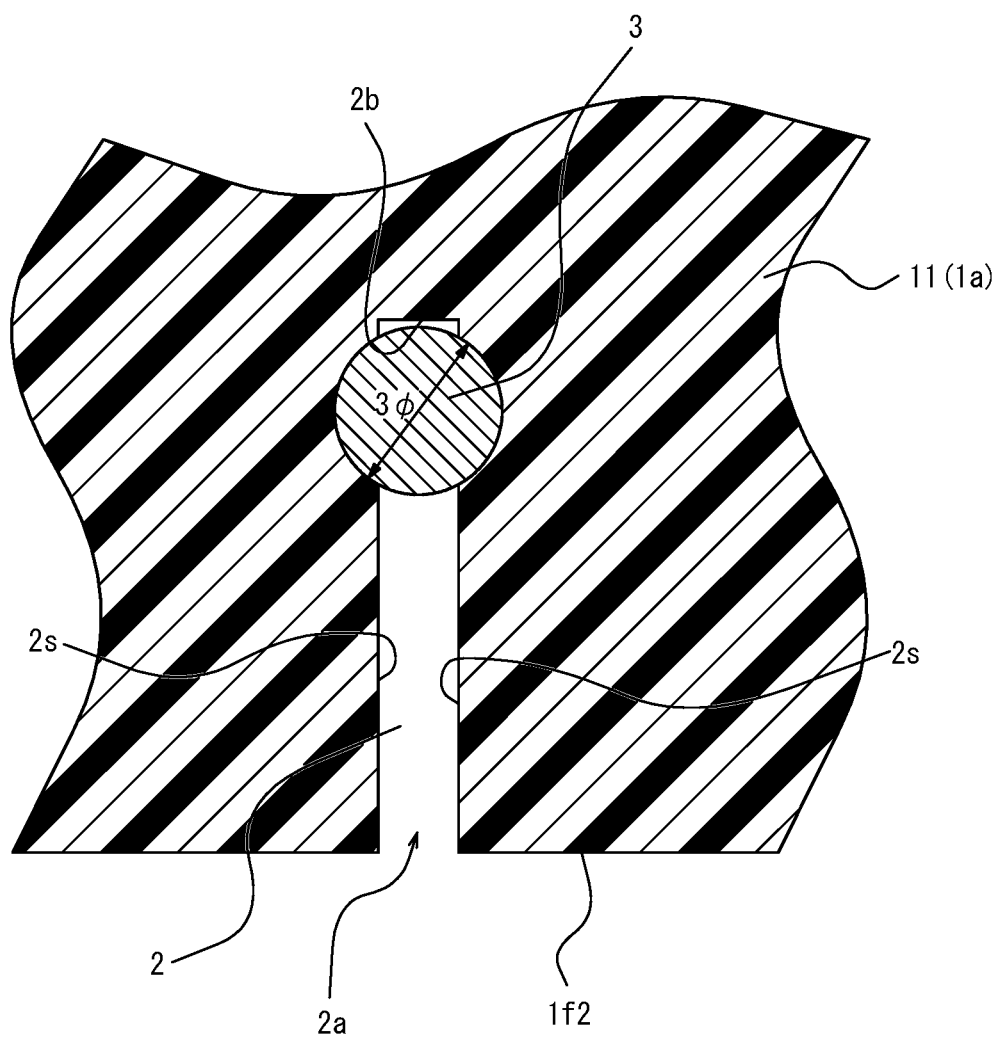
FIG. 5 is a Y-Y cross-sectional view of FIG. 2 illustrating a state in which a wire harness is embedded in a wiring groove formed in the seat pad of FIG. 1.

FIG. 1 is a plan view schematically illustrating the seat pad 1 from an upper side. FIG. 2 is a bottom view schematically illustrating the seat pad 1 from a lower side. FIG. 3 is an X-X cross-sectional view of the seat pad 1 of FIG. 1. FIG. 4 is a Y-Y cross-sectional view of FIG. 2. FIG. 5 is a Y-Y cross-sectional view of FIG. 2 illustrating a state in which a harness 3 is embedded in a wiring groove 2 formed in the seat pad 1.

The seat pad 1 is a seat pad including a surface portion 1a configured of a polyurethane foam 11. In this embodiment, the seat pad 1 is covered with the polyurethane foam 11. Referring to FIG. 2, in the surface portion 1a, wiring grooves 2 through which the wire harness (hereinafter also referred to as "harness") 3 is wired are formed. In this embodiment, the wiring grooves 2 are formed in the surface portion 1a of the seat pad 1 on the lower side. The wiring grooves 2 lead to, for example, depressed portions 1D in which heaters or the like are installed. Further, referring to FIG. 4, the wiring groove 2 has a groove width W and a groove depth D. The groove width W is narrower than the diameter $\phi 3$ of the harness 3, as illustrated in FIG. 5. The groove depth D is deeper than the diameter $\phi 3$ of the harness 3, as illustrated in FIG. 5.

FIG. 5 illustrates a state in which the harness 3 is embedded in the wiring groove 2. According to the seat pad 1, the harness 3 can be embedded in the wiring groove 2, as illustrated in FIG. 5, by pushing the harness 3 into the wiring groove 2 from an opening 2a of the wiring groove 2. The harness 3 is thereby protected by the polyurethane foam 11 that forms the wiring groove 2. Also, the harness 3 embedded in the wiring groove 2 is secured in a state compressed by the polyurethane foam 11 that forms the wiring groove 2. The harness 3 is thereby firmly secured in the wiring groove 2. Therefore, according to the seat pad 1, the harness 3 can be wired along the wiring groove 2 by easy work i.e., simply pushing the harness 3 into the wiring groove 2. Wiring work using the seat pad 1 is work of simply pushing the harness 3 into the wiring groove 2 without the use of a separate securing means such as tape.

Therefore, according to the seat pad 1, the workability of the wiring work is improved, and costs required for the wiring work are reduced.

In this embodiment, the seat pad 1 is a seat pad that includes a cushion pad (a pad located under the buttocks of a seated person). Referring to FIGS. 1 to 3, in this embodiment, the seat pad 1 is a cushion pad. Referring to FIG. 3, in this embodiment, the seat pad 1 includes the polyurethane foam 11 and an expanded foam 12 embedded in the polyurethane foam 11. A lower surface 1f2 of the seat pad 1 is formed of a lower surface 11f2 of the polyurethane foam 11. Here, the lower surface 1f2 of the seat pad 1 is, for example, with reference to the plane view of FIG. 2, a surface connecting the lowest points of the seat pad 1 at any positions in the front-back and left-right directions. Referring to FIG. 3, an entire lower surface 12f2 of the expanded foam 12 is located on an upper side with respect to the lower surface 11f2 of the polyurethane foam 11.

More specifically, in this embodiment, the seat pad 1 is a seat pad for a rear seat.

For example, referring to FIG. 1, in this embodiment, the seat pad 1 is a cushion pad for a rear seat in which two left and right seats are formed into one piece. In this embodiment, the seat pad 1 has two main pad portions 211. The main pad portions 211 are configured to support the buttocks and thighs of seated persons from the lower side. In this embodiment, the seat pad 1 also has a pair of side pad portions 212, which are configured to be located on left or right sides of the two main pad portions 211 and raised to the upper side from the main pad portions 211 to support the seated persons from both the left and right sides. Furthermore, in this embodiment, the seat pad 1 has a center pad portion 213 disposed between the two main pad portions 211. Additionally, in this embodiment, the seat pad 1 has mounting portions 214 for mounting the seat pad 1 to a vehicle. Furthermore, in this embodiment, the main pad portion 211 includes a lower thigh portion 211a, which is configured to support the thighs of a seated person from the lower side, and a lower buttock portion 211b, which is configured to be located on a rear side with respect to the lower thigh portion 211a and to support the buttocks of the seated person from the lower side. In this embodiment, the depressed portion 1D is located under the lower buttock portion 211b.

In this embodiment, the surface portion 1a of the seat pad 1 is formed of the polyurethane foam 11. The polyurethane foam 11 has elasticity. The polyurethane foam includes, for example, a soft polyurethane foam. In the seat pad 1, the expanded foam 12 can be a foam that is harder than the polyurethane foam and has elasticity. The expanded foam 12 includes, for example, an olefinic resin, specifically, expanded polypropylene (EPP) and expanded polystyrene (EPS). Here, the "expanded foam" is a foam obtained by the so-called bead-method foam. The bead-method foam is obtained by main-foaming pre-foamed foam beads in a molding die.

As illustrated in FIG. 4, in this embodiment, the wiring groove 2 is a U-shaped wiring groove in cross section when viewed in cross section in an upper-lower direction. In other words, the wiring groove 2 is a wiring groove with a gap formed in a groove width direction, as illustrated in FIG. 4. The groove width W of the wiring groove 2 is the width between side surfaces 2s of the wiring groove 2. In this embodiment, the groove width W of the wiring groove 2 is constant in a groove depth direction (upper-lower direction), as illustrated in FIG. 4. As a specific example of the groove width W, the groove width W can be 3 mm when the diameter $\phi 3$ of the harness 3 is 4 mm. As another specific example of the groove width W, the groove width W can be 5 mm when the diameter $\phi 3$ of the harness 3 is 10 mm.

In this embodiment, the groove width W is preferably a groove width capable of being molded using a molding die. In this case, the wiring groove 2 can be molded together with the seat pad 1 using the molding die. Therefore, in this case, the seat pad can be manufactured inexpensively. Such a groove width W includes, for example, groove widths of 2 mm or more.

In this embodiment, the groove depth D is preferably three or more times the diameter $\phi 3$ of the harness 3. In this case, even when the harness 3 is embedded at the center of the wiring groove 2 in the groove depth direction, a distance to the opening 2a of the wiring groove 2, which is formed in a surface (a surface of the surface portion 1a) of the polyurethane foam 11, is secured to be equal to or more than the diameter $\phi 3$ of the harness 3. Thus, in this embodiment, the distance to the opening 2a of the wiring groove 2 when the harness 3 is embedded can be secured to be large. Therefore, in this case, the harness 3 can be secured more firmly. As a specific example, when the diameter $\phi 3$ of the harness 3 is 4 mm or 10 mm, the groove depth D can be 35 mm $\leq$ D $\leq$ 50 mm.

By the way, in this embodiment, as illustrated in FIG. 3, the seat pad 1 has the expanded foam 12 disposed inside the surface portion 1a.

The polyurethane foam 11 ensures seating comfort as well as seating stability. The expanded foam 12 is harder than the polyurethane foam 11 and ensures seating stability. Therefore, in this embodiment, seating comfort is ensured, and seating stability is improved.

However, the expanded foam 12 has lower heat resistance than the polyurethane foam 11. Therefore, when the wiring groove 2 is formed in the surface portion 1a of the seat pad 1 (in particular, the lower surface 1f2 of the seat pad 1), the wiring groove 2 is directly affected by heat.

In this embodiment, the expanded foam 12 is disposed inside the polyurethane foam 11, and the wiring groove 2 is formed in the polyurethane foam 11. In this case, the effects of heat that may occur in the wiring groove 2 can be reduced, compared to when the wiring groove 2 is formed in the expanded foam 12. Therefore, in this case, the seat pad has the wiring groove 2 with excellent durability. For example, in the cases of electric vehicles, heat source devices, such as a battery and a motor, that generate high heat may be disposed under a rear seat. Therefore, the seat pad 1 is particularly effective for use as a seat pad for the rear seat, as in this embodiment.

In the seat pad 1, the polyurethane foam 11 is preferably configured of a soft polyurethane foam, and the expanded foam 12 is preferably configured of expanded polypropylene or expanded polystyrene. In this case, the use of a commonly used polyurethane foam and a commonly used expanded foam material results in a seat pad with excellent cost performance. In particular, when the expanded foam 12 is configured of expanded polystyrene, expanded polystyrene has lower thermal durability than other expanded foam materials. Therefore, when the expanded foam 12 is configured of expanded polystyrene, the application of the present disclosure is effective in improving thermal durability. However, according to the present disclosure, the seat pad 1 can be configured of only the polyurethane foam 11.

Figure 6:
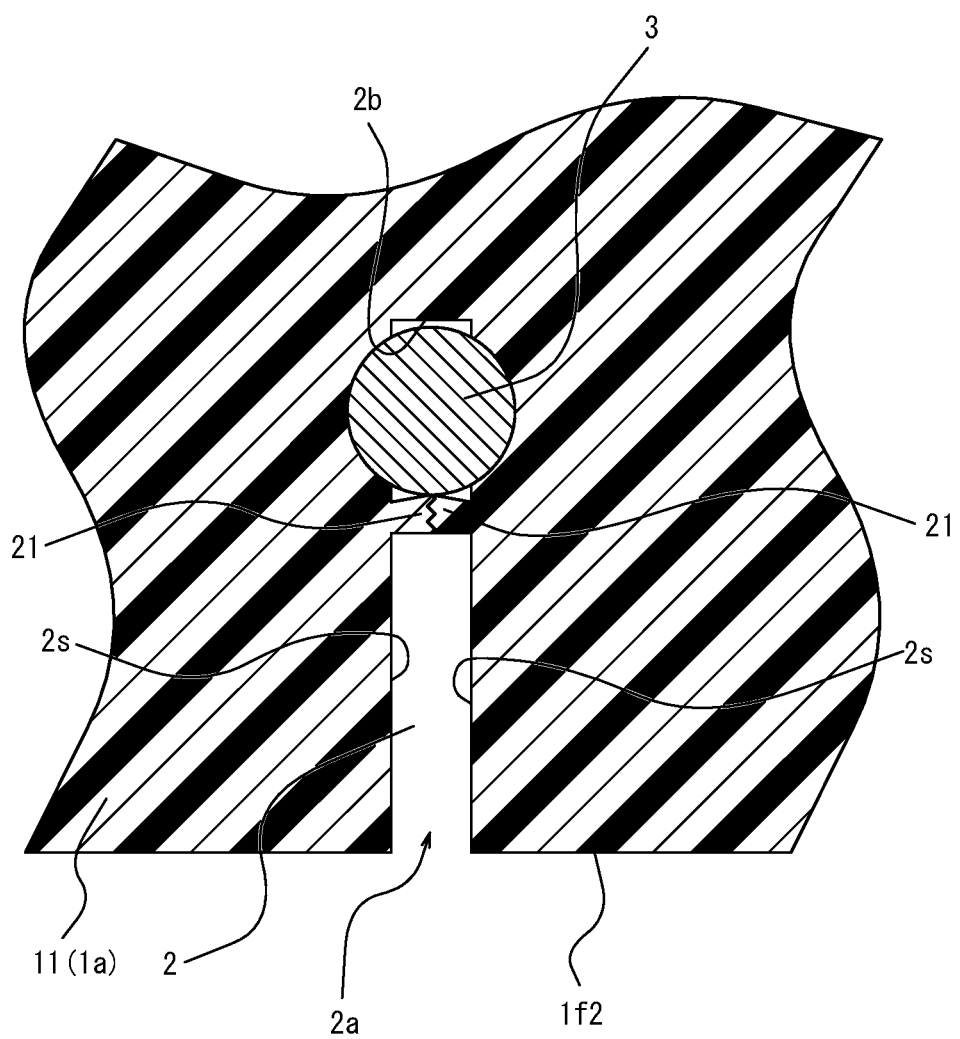
FIG. 6 is a Y-Y cross-sectional view of FIG. 2 illustrating another example of the wiring groove formed in the seat pad, in which the wire harness is embedded in the wiring groove.

FIG. 6 is a Y-Y cross-sectional view of FIG. 2 illustrating another example of the wiring groove 2 formed in the seat pad 1. In FIG. 6, the harness 3 is embedded in the wiring groove 2.

Referring to FIG. 6, on the side surfaces 2s of the wiring groove 2, projections 21 that project inward in the groove width direction are formed. In this case, the harness 3 can be secured more firmly.

In this embodiment, as illustrated in FIG. 6, the projections 21 are formed in such positions that the harness 3 embedded in the wiring groove 2 can be disposed between the projections 21 and a groove bottom 2b of the wiring groove 2. In this case, the projections 21 can secure the harness 3 more firmly by stopping the harness 3 from slipping out of the wiring groove 2.

In particular, as in this embodiment, the projections 21 are preferably formed on both the side surfaces 2s of the wiring groove 2. In this case, the harness 3 can be secured more firmly and stably. According to the present disclosure, the projection 21 can be formed on only one of the side surfaces 2s of the wiring groove 2. Also in this case, the harness 3 can be secured more firmly and stably.

According to the present disclosure, as yet another example, the projections 21 can be formed in such positions that the harness 3 embedded in the wiring groove 2 is not disposed between the projections 21 and the groove bottom 2b of the wiring groove 2, that is, in such positions that the harness 3 embedded in the wiring groove 2 contacts the projections 21. In this case, the projections 21 can secure the harness 3 more firmly because the projections 21 press the harness 3 embedded in the wiring groove 2.

(Seat Pad Manufacturing Method)

Figure 7:
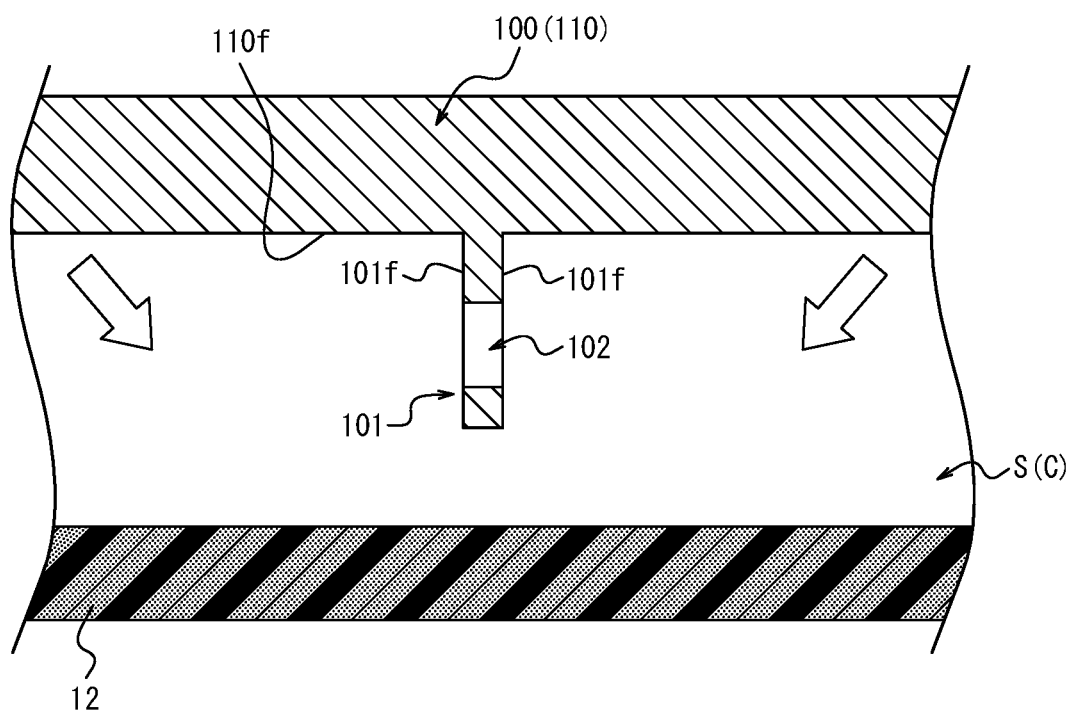
FIG. 7 is a diagram schematically illustrating a seat pad manufacturing method according to one embodiment of the present disclosure.
Figure 8:
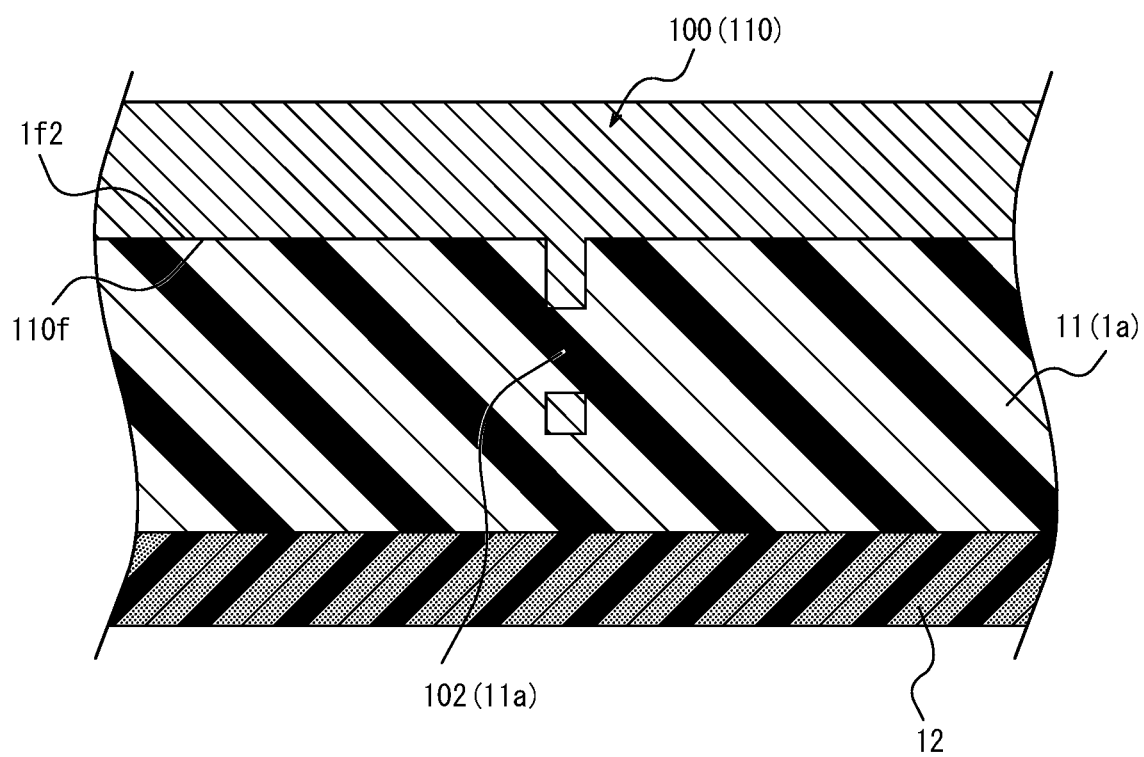
FIG. 8 is another diagram schematically illustrating the seat pad manufacturing method according to one embodiment of the present disclosure.
Figure 9:
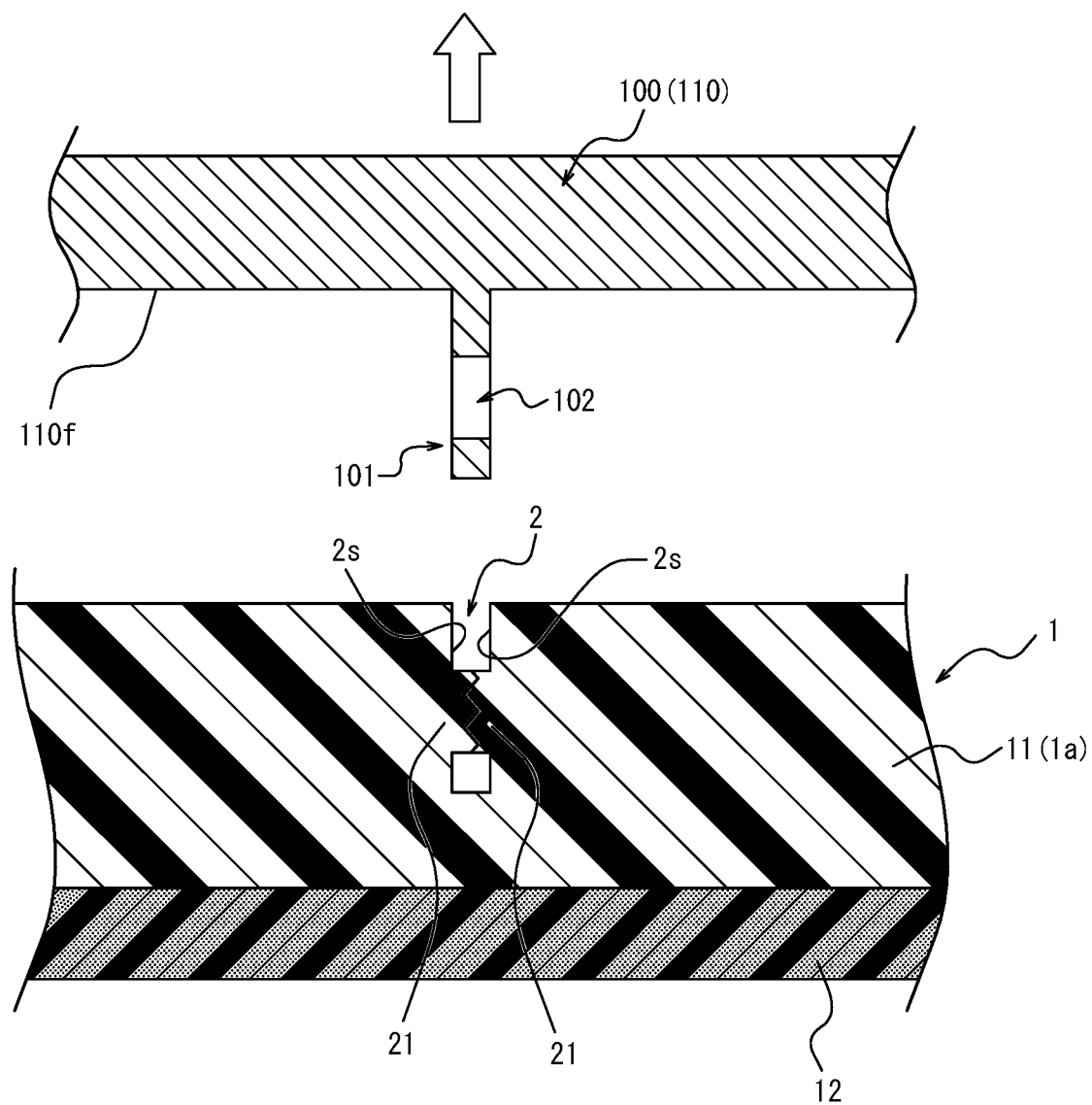
FIG. 9 is yet another diagram schematically illustrating the seat pad manufacturing method according to one embodiment of the present disclosure.
Figure 10:
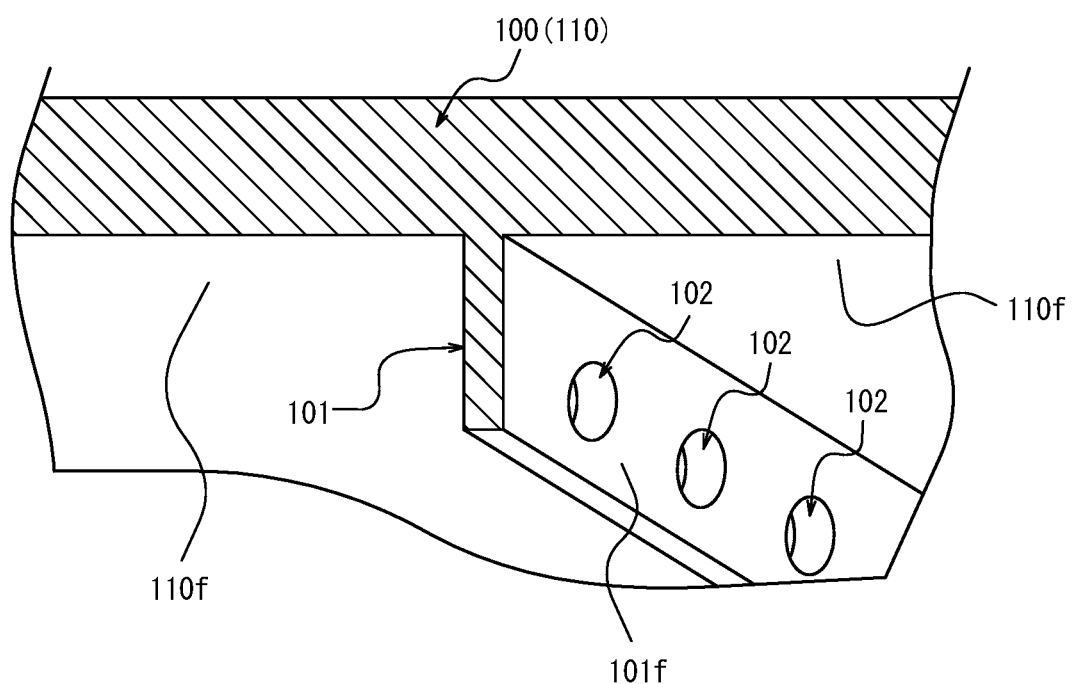
FIG. 10 is an essential portion cross-sectional perspective view schematically illustrating a groove-forming protrusion formed in a molding die used in the seat pad manufacturing method according to one embodiment of the present disclosure.

Next, a seat pad manufacturing method according to an embodiment of the present disclosure will be described. This manufacturing method can be suitably used to manufacture the seat pad 1 described using FIG. 6. FIGS. 7 to 9 are diagrams schematically illustrating the seat pad manufacturing method according to an embodiment of the present disclosure. FIG. 10 is an essential portion cross-sectional perspective view schematically illustrating a groove-forming protrusion 101 formed in a molding die 100 used in the seat pad manufacturing method according to an embodiment of the present disclosure.

The seat pad manufacturing method (hereinafter also referred to as "this manufacturing method") is a seat pad manufacturing method for obtaining, using at least the molding die 100 and a polyurethane foam material, a seat pad that includes the surface portion 1a configured of the polyurethane foam 11 and that is formed with the projections 21 projecting inward in the groove width direction from the side surfaces 2s of the wiring grooves 2 formed in the surface portion 1a.

Referring to FIG. 7, in this manufacturing method, as the molding die 100, a molding die that has the groove-forming protrusions 101 for forming the wiring grooves 2 and has holes 102 formed in side surfaces 101s of the groove-forming protrusions 101 is used.

This manufacturing method includes a polyurethane foam material supplying process in which the polyurethane foam material is supplied to the interior of the molding die 100, and a forcibly pulling-out process in which when a pre-molded product is removed from the molding die 100, molded portions formed in the holes 102 are forcibly pulled out of the holes 102 of the groove-forming protrusions 101.

In this manufacturing method, the interior of the molding die 100 refers to a cavity C formed inside the molding die 100. The molding die 100 has, for example, an upper die and a lower die. In this case, the cavity C is formed by aligning the upper die and the lower die. The cavity C forms the external shape of the seat pad 1. The interior of the molding die 100 has a space S formed between the molding die 100 and the expanded foam 12.

In this manufacturing method, an expanded foam setting process is first performed. Referring to FIG. 7, in the expanded foam setting process, the expanded foam 12 is disposed inside the molding die 100 so that the space S is formed between the molding die 100 and the expanded foam 12. In this embodiment, the openings 2a of the wiring grooves 2 are formed in the lower surface 1f2 of the seat pad 1. In this manufacturing method, the lower surface 1f2 of the seat pad 1 is formed by a cavity surface 110f of an upper die 110. Therefore, in this manufacturing method, the groove-forming protrusions 101 are formed on the cavity surface 110f of the upper die 110.

Next, the polyurethane foam material supplying process is performed. In this manufacturing method, a soft polyurethane foam material is supplied to the interior of the molding die 100. In this manufacturing method, as illustrated in the arrows of FIG. 7, the soft polyurethane foam material is supplied from the upper die 110 toward the lower side (the side of the expanded foam 12). This enhances the moldability of an upper side surface (in this embodiment, a joining surface to the expanded foam 12) of the seat pad 1.

When the foaming of the polyurethane foam material supplied to the interior of the molding die 100 is completed, as illustrated in FIG. 8, a pre-molded product is completed inside the molding die 100. In this manufacturing method, the pre-molded product has the polyurethane foam 11 as the surface portion 1a, and the expanded foam 12 is embedded as a core (seat pad body) of the seat pad 1. In the pre-molded product, molded pieces 11a are molded by the holes 102.

Next, in this manufacturing method, the forcibly pulling-out process is performed. The forcibly pulling-out process is an unmolding process to remove the pre-molded product from the molding die 100. In the unmolding process, as in general work, the upper die 110 and the lower die (not illustrated) are separated. At this time, as illustrated in FIG. 9, of the pre-formed product, the molded pieces 11a formed in the holes 102 are forcibly pulled out of the holes 102 of the groove-forming protrusions 101. Thereby, the projections 21 can be molded together with the wiring grooves 2 during molding of the seat pad 1.

The holes 102 can be either through holes or non-through holes (depressions). In this embodiment, the holes 102 are through holes. In this case, each of the molded pieces 11a is a connection piece that connects the side surfaces 2s of the wiring groove 2. In this manufacturing method, by forcibly pulling the molded pieces 11a of the pre-molded product out of the holes 102 of the groove-forming protrusions 101, each of the molding pieces 11a is divided into a side of one of the side surfaces 2s and a side of the other in the vicinity of the center of the wiring groove 2 in the groove width direction. The projections 21 are thereby formed on both the side surfaces 2s of the wiring grooves 2 through the simple work of removing the molding die.

As described above, according to this manufacturing method, it is possible to easily obtain the seat pad 1 that improves the workability of the wiring work and reduces the costs required for the wiring work.

In particular, in this manufacturing method, the holes 102 are through holes. When the holes 102 are non-through holes, the resin material may not reach the depths of the holes 102. In contrast, when the holes 102 are through holes, the molding of the projections 21 (molded pieces 11a) is easy because the resin material spreads through the holes 102. Therefore, according to this manufacturing method, the seat pad 1 can be obtained more easily.

Referring to FIG. 10, in this manufacturing method, a plurality of holes 102 is formed in the groove-forming protrusion 101. The holes 102 are formed at intervals in an extension direction of the groove-forming protrusion 101 (in a groove length direction of the wiring groove 2). In this case, in the seat pad 1 after molding, a plurality of projections 21 is formed in the groove length direction of each wiring groove 2. Thus, in this case, it is possible to obtain the seat pad 1 in which the harness 3 can be secured more firmly and stably. However, according to the present disclosure, the hole 102 can be formed at only one location in the extension direction of the groove-forming protrusion 101.

As described above, according to the present disclosure, it is possible to provide the seat pad that improves the workability of the wiring work and reduces the costs required for the wiring work, and to provide the seat pad manufacturing method for easily obtaining the seat pad.

The above is only an example of one embodiment of the present disclosure, and various modifications are possible in accordance with the scope of the claims. For example, the wiring groove 2 can be formed in the surface portion 1a of the seat pad 1 on at least one of the upper, lower, front, rear, left and right sides. Although the seat pad 1 is the cushion pad in the above description, the seat pad 1 can be a combination of the cushion pad and a back pad. In this case, the seat pad according to the present disclosure can be applied to the cushion pad, or at least one of the back pad and the cushion pad. The seat pad according to the present disclosure can also be the cushion pad, or only one of the back pad and the cushion pad. Furthermore, the seat pad according to the present disclosure can be a seat pad for a front seat.

REFERENCE SIGNS LIST

1 seat pad
2 wiring groove
2a opening of wiring groove
2b bottom surface of wiring groove
2s side surface of wiring groove
21 projection
3 wire harness
11 polyurethane foam
12 expanded foam
100 molding die
101 groove-forming protrusion
101f side surface of groove-forming protrusion
102 hole
D groove depth
W groove width

The invention claimed is:

1. A seat pad comprising:
a surface portion configured of a polyurethane foam, wherein
in the surface portion, a wiring groove for wiring a wire harness is formed, and
the wiring groove has a groove width narrower than a diameter of the wire harness, and a groove depth deeper than the diameter of the wire harness,
on a side surface of the wiring groove, projections that project inward in a groove width direction are formed in such positions that the wire harness embedded in the wiring groove can be disposed between the projections and a groove bottom of the wiring groove, and
the projections are formed on both side surfaces of the wiring groove, each of the projections being divided into a side of one of the side surfaces and a side of the other by forcibly pulling in the vicinity of the center of the wiring groove in the groove width direction.

2. The seat pad according to claim 1, wherein the groove width is a groove width capable of being molded using a molding die.

3. The seat pad according to claim 2, wherein the groove depth is three or more times the diameter of the wire harness.

4. The seat pad according to claim 3, wherein an expanded foam is disposed inside the surface portion.

5. The seat pad according to claim 2, wherein an expanded foam is disposed inside the surface portion.

6. The seat pad according to claim 1, wherein the groove depth is three or more times the diameter of the wire harness.

7. The seat pad according to claim 6, wherein an expanded foam is disposed inside the surface portion.

8. The seat pad according to claim 1, wherein an expanded foam is disposed inside the surface portion.

9. A seat pad manufacturing method for obtaining, using at least a molding die and a polyurethane foam material, a seat pad including a surface portion configured of a polyurethane foam, the seat pad being formed with a projection projecting inward in a groove width direction on a side surface of a wiring groove formed in the surface portion, the seat pad manufacturing method comprising:

using, as the molding die, a molding die that has a groove-forming protrusion to form the wiring groove and has a hole formed in a side surface of the groove-forming protrusion, the hole being a through hole, supplying the polyurethane foam material to an interior of the molding die; and forcibly pulling a molded portion formed in the hole out of the hole of the groove-forming protrusion when a molded product is removed from the molding die.

* * * * *